United States Patent [19]

Hirahara et al.

[11] Patent Number: 5,239,045
[45] Date of Patent: Aug. 24, 1993

[54] COPOLYESTER AND HOLLOW CONTAINER AND ORIENTED FILM COMPRISING THE COPOLYESTER

[75] Inventors: Takuji Hirahara, Kawasaki; Katsuji Tanaka, Machida; Kazuyoshi Mino, Yokohama, all of Japan

[73] Assignee: Mitsubishi Kasei Corporation, Tokyo, Japan

[21] Appl. No.: 805,678

[22] Filed: Dec. 12, 1991

[30] Foreign Application Priority Data

Dec. 27, 1990 [JP] Japan .................................. 2-407795
Jan. 31, 1991 [JP] Japan .................................. 3-011238
Nov. 14, 1991 [JP] Japan .................................. 3-299271

[51] Int. Cl.$^5$ ..................... C08G 63/00; C08G 63/02; C08G 67/00
[52] U.S. Cl. ................................. 528/272; 528/176; 528/194; 528/271
[58] Field of Search ................. 528/176, 194, 271, 272

[56] References Cited

U.S. PATENT DOCUMENTS 4,440,922  4/1984  Barbee et al. .
4,546,170  10/1985 Barbee et al. .
4,552,948  11/1985 Barbee et al. .
4,959,421  9/1990  Hirahara et al. ..................... 525/437
5,030,705  9/1991  Hirahara et al. ..................... 528/176

FOREIGN PATENT DOCUMENTS 0335594 10/1989 European Pat. Off. .

Primary Examiner—John Kight, III
Assistant Examiner—T. Mosley
Attorney, Agent, or Firm—Oblon, Spivak, McClelland, Maier & Neustadt

[57] ABSTRACT

A copolyester comprising a dicarboxylic acid component comprising (a) 80 to 99.5 mol % of terephthalic acid or an ester forming derivative thereof and (b) 0.5 to 4.5 mol % of a phenylenedioxy diacetic acid or an ester forming derivatives thereof and a diol component is described. Hollow containers and stretched film produced from the copolyester are further described. The copolyester has a high transparency, superior gas barrier property, mechanical strength, water resistance and heat resistance. In addition, since the copolyester has a low oligomer content, it scarcely contaminates a mold used in molding process, which leads to a high productivity. The molded article produced from the copolyester can be used widely as packaging materials including various films, sheets and containers. Moreover, since a molded article having superior properties is obtained form the copolyester alone, it is possible to manufacture various packaging materials without using a complicated apparatus and complicated process.

8 Claims, No Drawings

COPOLYESTER AND HOLLOW CONTAINER AND ORIENTED FILM COMPRISING THE COPOLYESTER

BACKGROUND OF THE INVENTION

The present invention relates to a copolyester having a high transparency, superior strength and superior gas barrier property, and a packaging material produced by the copolyester.

Polyethylene terephthalate (hereinafter, sometimes abbreviated as "PET") is excellent in mechanical strength, chemical safety, transparency, and hygienic property and is light in weight and low in cost. Therefore PET is widely used in packaging materials such as sheets, films and containers.

However, although the gas barrier property of PET is superior comparing with other resins including polyolefin, it is not considered to be sufficient in some application fields where a higher performance is required. For instance, a packaging material for carbonated beverage, beer and wine is required to have high oxygen gas barrier property and carbon dioxide gas barrier property in order to preserve the content, and a generally used hollow container of a biaxially oriented PET cannot satisfy these strict requirements on gas barrier properties. Moreover, there is a demand to supply a film which has low permeability of gas such as oxygen or moisture, and does not lower its performance under freezing process, boiling treatment and retort treatment, for the packaging of fresh food, medical equipment etc.

To solve these problems, various methods for improving the gas barrier property of packaging materials prepared from polyethylene terephthalate, for example, a method wherein various gas barrier materials are blended with PET and a method wherein various gas barrier materials are laminated or coated on PET film, have been proposed.

The present inventors have found that a specific copolyester obtained by using isophthalic acid and phenylenedioxy diacetic acid as the main acid components can be used as superior gas barrier material (Japanese Patent Application Laid-Open (KOKAI) Nos. 1-247422(1989), 21-47423(1989), 1-167331(1989), 2-182455(1990) and 2-14238(1990), and U.S. Pat. No. 4,959,421).

Also, it is known that the polyester copolymer prepared by 5 to 100 mol % of phenylenedioxy diacetic acid and 0 to 95 mol % of terephthalic acid as acid component is an excellent material in view of gas barrier property (Japanese Patent Application Laid-Open (KOKAI) No. 60-501060(1985), U.S. Pat. No. 4,440,992, and U.S. Pat. No. 4,552,948).

However, generally these gas barrier materials do not show sufficient mechanical strength and heat resistance so that it is difficult to mold these materials singly. When a gas barrier material is blended to PET, it is difficult to maintain the mechanical strength, heat resistance, etc., which are inherent in PET. Moreover, on the method of coating or laminating a gas barrier material onto PET, there are various problems to be considered in the selection of molding condition, adhesive property between layers, or thickening of container wall.

SUMMARY OF THE INVENTION

The object of the invention is to provide a copolyester which has superior physical properties such as gas barrier property, mechanical strength, heat resistance and water resistance and has high transparency, and provide a molded article such as sheets, films and hollow containers prepared therefrom.

As a result of serious investigation to accomplish said object, the present inventors have found that a copolyester made by using the dicarboxylic acid component comprising terephthalic acid as the main ingredient and a small amount of phenylenedioxy diacetic acid in a specified range is unexpectedly superior in all physical properties including mechanical strength, heat resistance, water resistance, and gas barrier property and is sufficiently possible to produce a molded article by the single use of the copolyester. The present invention has been attained based on this finding.

DETAILED DESCRIPTION OF THE INVENTION

The copolyester of the present invention is produced by copolymerizing a dicarboxylic acid component comprising (a) 80 to 99.5 mol % of terephthalic acid or an ester forming derivative thereof, and (b) 0.5 to 4.5 mol % of a phenylenedioxy diacetic acid or an ester forming derivatives thereof, and a diol component.

Terephthalic acid or the ester forming derivatives thereof used in the present invention may be any compounds based on terephthalic acid which is reactive with diol components, and may include terephthalic acid, a nucleus-substituted derivative such as 2-chloroterephthalic acid and 2-methoxyterephthalic acid, an ester derivative such as dimethyl terephthalate and diethyl terephthalate, and an acid halide derivative such as terephthaloyl dichloride.

The phenylenedioxy diacetic acid or the ester forming derivative thereof may include 1,2-phenylenedioxy diacetic acid, 1,3-phenylenedioxy diacetic acid, 1,4-phenylenedioxy diacetic acid, 2-methyl-1,3 phenylenedioxy diacetic acid, 5-methyl-1,3-phenylenedioxy diacetic acid, 6-methyl-1,3-phenylenedioxy diacetic acid, 5-ethyl-1,3-phenylenedioxy diacetic acid, 6-ethyl-1,3-phenylenedioxy diacetic acid, 5-methoxy-1,3-phenylenedioxy diacetic acid, 6-methoxy-1,3-phenylenedioxy diacetic acid, 4-chloro-1,2-phenylenedioxy diacetic acid, 4-chloro-1,3-phenylenedioxy diacetic acid, acid anhydrides thereof, acid halides thereof, and esters thereof. These compounds may be used singly or in combination of two or more compounds, for example, a combination of position isomers such as a combination of 1,2-isomer and 1,3-isomer. Among these, the preferable compound are 1,3-phenylenedioxy diacetic acid or the ester forming derivatives thereof and a more preferable compound is 1,3-phenylenedioxy diacetic acid.

In the dicarboxylic acid component constituting the copolyester of the present invention, the ratio of the unit derived from terephthalic acid is 80 to 99.5 mol %, preferably 90 to 99.0 mol %, and the ratio of the unit derived from the phenylenedioxy diacetic acid is 0.5 to 4.5 mol %, preferably 1.0 to 4.0 mol %. When the unit derived from terephthalic acid is below 80 mol %, the mechanical strength and the heat resistance are insufficient. On the other hand, when the unit derived from the phenylenedioxy diacetic acid is below 0.5 mol %, the improvement of gas barrier property is not sufficient and in case it exceeds 4.5 mol %, there is a tendency to give rise to such troubles as heat decomposition, adhesion and the like during molding process. Moreover, the transparency, mechanical strength and heat resistance of molded article are considerably decreased so that such polymer is not suitable to be used alone as a starting material for a molded article. In addition, if the unit derived from the phenylenedioxy diacetic acid is contained over 4.5 mol %, the gas barrier property of a non-stretched sheet is improved, however, a stretched sheet obtained therefrom surprisingly is not always improved in the gas barrier property.

The copolyester of the present invention, as far as each of the units derived from terephthalic acid and phenylenedioxy diacetic acid satisfies respectively the ratio range described above, it may contain a small amount of other unit derived from other dicarboxylic acid, hydroxycarboxylic acid or their derivatives. These other dicarboxylic acids may contain an aromatic dicarboxylic acid such as phthalic acid, isophthalic acid, 4,4'-diphenoxyethanedicarboxylic acid, 4,4'-diphenylsulfonedicarboxylic acid, 4,4'-biphenyldicarboxylic acid and their structural isomers, and an aliphatic dicarboxylic acid such as malonic acid, succinic acid, and adipic acid. And p-hydroxybenzoic acid, esters of p-hydroxybenzoic acid and glycolic acid may be mentioned as the hyroxycarboxylic acid and its derivatives.

The diol components of the copolyester may include a aliphatic glycol such as ethylene glycol, 1,2-propanediol, 1, 3-propanediol, 1,4-butanediol, pentamethylene glycol, hexamethylene glycol, neopentyl glycol, diethylene glycol, etc., an alicyclic glycol such as cyclohexane dimethanol, and an aromatic dihydroxy compound such as bisphenol A and bisphenol S. Among these compounds, generally, ethylene glycol is most preferred. The diol component is used in an amount substantially equivalent to the dicarboxylic acid component described above.

The copolyester of the present invention may contain as the constitutional component a mono-functional compound such as o-benzoylbenzoic acid or a poly-functional compound such as trimethylolpropane, pentaerythritol, glycerin, trimellitic acid, trimesic acid, pyromellitic acid and a glycidyl ether of aromatic dihydroxy compounds such as bisphenol A glycidyl ether, as far as these additional components do not injure requirement of the present invention. These mono-functional or poly-functional components can be used up to 20 mol %, preferably up to 10 mol %, and further preferably up to 5 mol % of the diol component.

A conventionally known additive, for example, antioxidant, UV absorber, fluorescent brightening agent, mold release agent, antistatic agent, dispersant and colorant such as dye and pigment can be added to the copolyester. These additives may added in any step during polyester manufacturing or in masterbatching step before molding process.

The intrinsic viscosity of the copolyester of the present invention as measured in a mixed solvent of phenol and tetrachloroethane (weight ratio 1/1) at 30° C. is preferred in the range from 0.4 to 2.0, preferably 0.5 to 1.5. When the intrinsic viscosity is below 0.4, the strength of the copolyester is poor so that it is impossible to obtain the physical properties required for practical use when the copolyester is taken out of the reaction vessel after completion of polymerization and cut it into chips, or molded it into sheets, films or containers such as bottles, barrels and cans. In case the intrinsic viscosity is over 2.0, there are problems that the melt viscosity becomes so high that the molding process such as injection molding, extrusion molding and blow molding becomes very difficult to be carried out.

The copolyester of the present invention can be produced by any polymerization method which is conventionally known as a polymerization method for polyethylene terephthalate. For example, there is a method comprising the steps of directly esterifying terephthalic acid, 1,3-phenylenedioxy diacetic acid and ethylene glycol under pressure and thereafter gradually reducing the pressure while raising the temperature to polycondense the esterified product. The copolyester of the present invention can be further produced by another method wherein an ester of terephthalic acid such as dimethyl terephthalate, an ester of the 1,3-phenylenedioxy diacetic acid such as dimethyl 1,3-phenylenedioxydiacetate and ethylene glycol are subjected to ester interchange reaction, and thereafter the reaction product is further subjected to polycondensation. In these production reactions, the phenylenedioxy diacetic acid can be added at any stage during the ester interchange reaction or the initial stage of polycondensation reaction. For example, ester interchange reaction between an ester of terephthalic acid and ethylene glycol is first carried out, and then the phenylenedioxy diacetic acid is added to the reaction product to carry out polycondensation. Further, if necessary, it is possible to attain higher degree of polymerization, low acetaldehyde formation and low oligomerization degree by subjecting the copolymer to heat treatment after the polymerization. The heat treatment is preferably carried out in the range from a temperature just below the melting point of the copolyester to a temperature 80° C. below the melting point for several ten hours or less, after the surface of chip is crystallized at 80° to 180° C.

In the production method of the copolyester described above, it is preferable to use esterification catalyst, ester interchange catalyst, polycondensation catalyst, and stabilizer. As the ester interchange catalyst, at least one known compound selected from calcium, manganese, zinc, sodium and lithium compounds can be used. A manganese compound is preferable because it can provide a copolyester of a higher transparency. As the polycondensation catalyst, at least one known compound selected from antimony, germanium, titanium and cobalt compounds can be used. Antimony, germanium and titanium compounds are preferred.

The copolyester thus obtained can be molded into films, sheets, containers and other packaging materials by a melt molding method usually employed in PET molding. The non-stretched sheet or film obtained from the copolyester of the present invention can be used as a high gas barrier material. Moreover, the gas barrier property and mechanical strength can be improved by stretching the non-stretched film or sheet in at least to one direction.

The oriented copolyester film of the present invention is obtained by subjecting a non-stretched sheet obtained by injection molding or extrusion molding of the copolyester to any stretching method of uniaxial stretching, successive biaxial stretching, and simultaneous biaxial stretching which are usually employed in PET stretching. The copolyester can be molded into cups and trays by air-pressure molding or vacuum molding.

When producing these oriented films, the stretching temperature may be selected between the glass transition temperature of the polyester of the present invention and a temperature 70° C. higher than the glass transition temperature, usually between 40° and 170° C., preferably 60° and 140° C. Both uniaxial and biaxial stretching method are applicable, but biaxial stretching is preferred because a biaxially oriented film has physical properties required in practical use. The stretching ratio is usually 1.1 to 10 times for the uniaxial stretching, and preferably 1.5 to 8 times. In the case of biaxial stretching, the stretching ratio is 1.1 to 8 times, preferably 1.5 to 5 times, for each of the machine and transverse directions. The stretching ratio is the machine direction is preferred to be 0.5 to 2 times, more preferably 0.7 to 1.3 times the stretching ratio in the transverse direction.

The thickness of a non-stretched sheet is 50 to 2000 $\mu$m, preferably 100 to 1000 $\mu$m. If it is below 50 $\mu$m, the non-stretched sheet has a tendency to break during the stretching step and if it is over 2000 $\mu$m, the quenching thereof becomes difficult and simultaneously a uniform stretching becomes difficult because of the increase in tension of stretching.

The oriented film thus obtained can be used as it is, however the gas barrier property and the mechanical strength can be further improved by subjecting an oriented film to heat setting for 0.1 to 30 minutes, preferably 0.5 to 5 minutes at a temperature from 100° C. to the melting point of the copolyester, preferably 150° to 230° C., under the tension.

The hollow molded article of the copolyester of the present invention is produced by the stretching-blow molding of a preform prepared from the copolyester. The apparatus conventionally used in blow molding of PET can be used in the production of the hollow molded article. More specifically, a biaxial stretching blow molding such as a hot parison process or a cold parison process is adopted in which a preform is first produced by ordinary extrusion molding or injection molding of the copolyester, and the thus obtained preform is reheated and biaxially stretched as it is or after processing the mouth portion and the bottom portion thereof. The stretching temperature is 70° to 120° C., preferably 80° to 110° C., and the stretching ratio is 1.5 to 3.5 times in the machine direction and 2 to 5 times in the circumferential direction.

The hollow molded article obtained can be directly used, but in the case where it is used for a container for a liquid content requiring hot filling such as fruits juice drinks, it is preferred to improve the heat resistance thereof by heat setting in the same blow mold as used for molding or another mold equipped separately. This heat setting is usually carried out for from 2 seconds to 2 hours, preferably 10 seconds to 30 minutes, at 100° to 200° C., preferably 120° to 180° C., under tension by compressed air or mechanical stretching.

Further, the molded article of the present invention can be also produce from a blend of the copolyester and a polyalkylene terephthalate mainly comprising PET, or it may be formed in a laminated structure of a layer of the copolyester and a layer of a polyalkylene terephthalate mainly comprising PET.

The present invention, hereinafter, will be explained in more detail referring to the following examples, but the present invention is not restricted to the following examples.

In the following examples, "part" means "weight part" and the methods for measurements shown in examples are as follows.

1. Intrinsic viscosity

The intrinsic viscosity was determined in a mixed solvent of phenol and tetrachloroethane (Weight ratio 50/50) at 30° C.

2. Acetaldehyde content

The content was determined by gas chromatography after water extraction of a copolyester for 2 hours at 160° C. 3. Flow rate of inactive gas The flow amount of inactive gas per unit time (hour) and per unit resin weight (kg) was determined. The flow rate was expressed by a converted value of this flow amount to a gas volume (liter) at one atmospheric pressure and 25° C.

4. Gas permeability

The gas permeability was determined with oxygen permeability measuring equipment "OX-TRAN 10/50A" (manufactured by Modern Controls, USA) and carbon dioxide permeability measuring equipment "PERMATRAN C-IV" (manufactured by Modern Controls, USA) at 100% RH and 23° C., and expressed in $cc.mm/m^2.day.atm$.

5. Creep resistance test

Into distilled water adjusted at 0° C., were dissolved 12.5 g of citric acid hydrate, and then the total aqueous solution was filled into a sample bottle made from a copolyester. Further, the sample bottle was added with 15.0 g of sodium bicarbonate, immediately sealed tightly, and shaken for several ten seconds to dissolve the sodium bicarbonate. The condition in the sample bottle thus treated corresponded to that filled with carbon dioxide gas in a volume 4.0 times the volume of the sample bottle at 0° C. and 1 atm. The sample bottle was placed onto a flat plane in an atmosphere of 23° C. and 50% humidity or 38° C. and 90% humidity, and the height of the fill point was read after 2 hours and after 3 to 12 weeks of the storage under the same condition to obtain the fill point drop variation. A smaller fill point drop variation means a better creep resistance.

6. Mechanical strength and elongation

Mechanical strength and elongation of the body of a sample bottle were determined in accordance with the method of JIS-K 7113 under the condition of 23° C. and 50% humidity using a tensile tester manufactured by INTESCO Co.

7. Heat resistance

Into a sample bottle, was filled 990 ml of hot water of a predetermined temperature, and the bottle was tightly sealed and left at room temperature for 1 hour. Then the bottle emptied with the content is visually observed whether its deformation occurs or not. Three bottles were examined for each run by this method and the lowest temperature at which deformation was observed was expressed as the critical temperature for heat resistance.

8. Cyclic trimer content (CT content)

In 2 ml of solution of chloroform/hexafluoroisopropanol (volume ratio 3/2), were dissolved 200 mg of a copolyester and the solution was diluted by further adding 20 ml of chloroform. By adding 10 ml of methanol to this solution, the copolyester was precipitated and the precipitate was filtered off to obtain a filtrate. The filtrate was evaporated to dryness and the residue was dissolved in 25 ml of dimethylformamide. This solution was subjected to quantitative analysis by liquid chromatography to determine the CT content.

The cyclic trimer is the main component of oligomers which are by-produced during copolymerization. The oligomer adheres to a mold and contaminates it during the molding of a copolyester, thereby causing lowering in production efficiency. Therefore, a lower CT content is preferred.

EXAMPLE 1

Into a reaction vessel, were charged 9583 parts of dimethyl terephthalate (96 mol % of the acid component), 6390 parts of ethylene glycol and 2.1 parts of manganese acetate tetrahydrate. The mixture was heated gradually from 160° to 220° C. over 4 hours to complete ester interchange reaction. To the reaction product, were added 470 parts of 1,3-phenylenedioxy diacetic acid (4 mol % of the acid component), 1.5 parts of orthophosphoric acid and 1.5 parts of germanium dioxide and the temperature was raised gradually from 220° C. while gradually decreasing the pressure in the polymerization vessel to carry out polycondensation at 275° C. under 0.5 torr for three hours. As a result, transparent copolyester chips having an intrinsic viscosity of 0.63 were obtained.

After the surface of the copolyester chips was crystallized in a stirring crystallization apparatus (manufactured by Bepex Co., USA) at 150° C., the copolyester was transferred into a stationary solid phase polymerization tower, dried for 3 hours at 120° to 160° C. under the stream of 20 liter/kg.hr nitrogen gas, and polymerized for 10 hours at 200° C. The solid-phase polymerized copolyester had an intrinsic viscosity of 0.88, an acetaldehyde content of 2.2 ppm and a CT content of 0.37 wt %.

A preform was prepared from the copolyester chips subjected to solid phase polymerization by using an injection molding machine IS-60B manufactured by Toshiba Corporation under the following conditions:
temperature of nozzle and each part of cylinder: 275° C.,
screw rotation: 100 rpm,
injection time: 10 seconds, and
temperature of cooling water for mold: 10° C.

A bottle having 1 liter volume and 300 μm of average body thickness was obtained from this preform using biaxial stretching blow molding machine of the following conditions:
preheater temperature: 90° C.,
blow pressure: 20 kg/cm$^2$, and
molding cycle: 10 seconds.

The results of the measurements on gas permeability, CT content, fill point drop variation and mechanical strength and elongation of the bottle body are shown in Table 1.

EXAMPLE 2

Into an autoclave, were charged 8200 parts of terephthalic acid (96 mol % of the acid component), 470 parts of 1,3-phenylenedioxy diacetic acid (4 mol % of the acid component), and 3835 parts of ethylene glycol, and esterification reaction was carried out at 220° to 245° C. for 3 hours with stirring under nitrogen gas atmosphere (2.5 kg/cm$^2$) while distilling off the water produced during the reaction. The esterified product was added with 1.5 parts of orthophosphoric acid and 1.5 parts of germanium dioxide. After 3-hour polycondensation reaction carried out in accordance with the method in Example 1, transparent copolyester chips having 0.65 of intrinsic viscosity were obtained. The thus obtained chips were further subjected to the same solid phase polymerization as in Example 1 to obtain chips having 0.86 of intrinsic viscosity, 2.0 ppm of acetaldehyde content and 0.37 wt % of CT content. One liter bottle was obtained by the same blow molding procedure as in Example 1. The results of measurements on gas permeability, CT content, fill point drop variation, and mechanical strength and elongation of the body of the bottle are shown in Table 1.

EXAMPLE 3

Copolyester chips having 0.86 of intrinsic viscosity, 2.0 ppm of acetaldehyde content and 0.39 wt % of CT content after solid phase polymerization was obtained in the same procedures as in Example 1 except for using 9712 parts of dimethyl terephthalate (97 mol % of the acid component), 6500 parts of ethylene glycol, and 350 parts of 1,3-phenylenedioxy diacetic acid (3 mol % of the acid component). A smaller preform, in which the neck length, the outer diameter of the body and the body thickness were respectively 0.8, 0.8 and 1.32 times those of the preform in Example 1, was produced from the copolyester chips thus obtained. One liter bottle was prepared by the same blow molding method as in Example 1. The results of measurements on gas permeability, CT content, fill point drop variation, and mechanical strength and elongation of the body of the obtained bottle are shown in Table 1.

COMPARATIVE EXAMPLE 1

One liter bottle was obtained using polyethylene terephthalate for molding bottle (manufactured by Japan Unipet Co., Ltd., RT-543C) by the same blow molding method as in Example 1. The results of measurements on gas permeability, CT content, fill point drop variation, and mechanical strength and elongation of the body of the bottle are shown in Table 1.

COMPARATIVE EXAMPLE 2

Solid phase polimerized chips having 0.87 of intrinsic viscosity, 2.0 ppm of acetaldehyde content and 0.48 wt % of CT content were obtained by the same procedure as in Example 1 except the use of 9392 parts of dimethyl terephthalate (94 mol % of the acid component), 6450 parts of ethylene glycol and 698 parts of 1,3 phenylenedioxy diacetic acid (6 mol % of the acid component). One liter bottle was obtained from these chips by the same blow molding procedure as in Example 1. The results of measurements on gas permeability, fill point drop variation, and mechanical strength and elongation of the body of the bottle are shown in Table 1.

Considerable amount of adhesion between the chips was observed when the prepolymer of the chips were crystallized in a stirring crystallization apparatus, and many deformed chips or fused chips of 3 or 4 pieces were recognized even after the solid phase polymerization.

TABLE 1

|  | Example 1 | Example 2 | Example 3 | Comp. Ex. 1 | Comp. Ex. 2 |
| --- | --- | --- | --- | --- | --- |
| Copolyester Composition (PDDA/TPA) (mol ratio) | 4/96 | 4/96 | 3/97 | 0/100 | 6/94 |
| O$_2$ gas Permeability (cc · mm/m$^2$ · day · atm) | 1.30 | 1.28 | 1.10 | 1.95 | 1.45 |
| CO$_2$ gas Permeability | 6.51 | 6.50 | 5.71 | 9.96 | 7.01 |

TABLE 1-continued

|  | Example 1 | Example 2 | Example 3 | Comp. Ex. 1 | Comp. Ex. 2 |
|---|---|---|---|---|---|
| (cc · mm/m$^2$ · day · atm) |  |  |  |  |  |
| CT content (wt %) | 0.41 | 0.41 | 0.43 | 0.62 | 0.53 |
| Fill point drop variation (mm) |  |  |  |  |  |
| Temp. 23° C. |  |  |  |  |  |
| Humi. 50% |  |  |  |  |  |
| 6 weeks | 2.9 | 3.0 | 2.7 | 2.9 | 6.4 |
| 12 weeks | 3.2 | 3.2 | 2.9 | 3.1 | 8.6 |
| Temp. 38° C. |  |  |  |  |  |
| Humi. 90% |  |  |  |  |  |
| 3 weeks | 3.9 | 3.9 | 3.9 | 3.8 | 9.8 |
| 6 weeks | 5.7 | 5.8 | 5.3 | 5.5 | 14.1 |
| 12 weeks | 6.2 | 6.3 | 5.5 | 6.0 | — |
| Mechanical strength and elongation |  |  |  |  |  |
| Machine Direction |  |  |  |  |  |
| Yield strength (kg/mm$^2$) | 10.7 | 10.7 | 10.5 | 10.1 | 7.8 |
| Breaking strength (kg/mm$^2$) | 13.5 | 13.6 | 13.4 | 13.1 | 9.1 |
| Elongation at break (%) | 61.6 | 61.8 | 60.5 | 59.6 | 71.3 |
| Transverse direction |  |  |  |  |  |
| Yield strength (kg/mm$^2$) | 11.4 | 11.5 | 11.9 | 12.5 | 9.5 |
| Breaking strength (kg/mm$^2$) | 15.0 | 15.0 | 15.3 | 16.0 | 11.8 |
| Elongation at break (%) | 38.1 | 38.1 | 37.5 | 37.3 | 53.0 |

Note: PDDA is Phenylenedioxy diacetic acid unit; and TPA is terephthalic acid unit

EXAMPLE 4

A similar preform as in Example 3 was prepared from the solid phase polymerized chips obtained in Example 3. The preform was blow-molded to one liter bottle using a stretching blow molding machine equipped with a heat setting device, and the thus molded bottle was subjected to heat setting at 150° C. for 10 seconds to obtain a heat-resistant bottle for fruit juice. The results of measurements on gas permeability and heat resistance of the body of the heat-resistant bottle are shown in Table 2. There was no deformation in the bottle when the bottle was filed with a fruit juice which was sterilized at 90° C. and cooled to 85° C., turned upside down after tightly sealing the bottle, and allowed to stand for 15 minutes

COMPARATIVE EXAMPLE 3

One liter heat-resistant bottle for fruit juice was obtained from a polyethylene terephthalate for molding heat-resistant bottle (manufactured by Nihon Unipet, RT-543G) by the same blow molding and heat setting procedures as in Example 4. The results of measurements on gas permeability and heat resistance of the bottle body are shown in Table 2. No bottle deformation was found when the bottle was filled with a fruit juice of 85° C., turned upside down and allowed to stand in the same manner as in Example 4. The bottle in this Comparative Example 3 showed a heat resistance comparative to that of Example 4, but was inferior in gas barrier property.

COMPARATIVE EXAMPLE 4

A bottle for fruit juice was obtained from the solid polymerized chips obtained in Comparative Example 2 by the same blow molding and heat setting procedures as in Example 4. The result of measurement on heat resistance of the bottle body is shown in Table 2. Considerable deformation was observed through entire bottle when the bottle was filled with a fruit juice of 85° C. in the same manner as in Example 4.

TABLE 2

|  | Example 4 | Comp. Ex. 3 | Comp. Ex. 4 |
|---|---|---|---|
| Polyester composition (PDDA/TPA) (mol ratio) | 3/97 | 0/100 | 6/94 |
| O$_2$ gas Permeability (cc · mm/m$^2$ · day · atm) | 1.04 | 1.43 | — |
| CO$_2$ gas Permeability (cc · mm/m$^2$ · day · atm) | 5.30 | 6.90 | — |
| Heat resistance |  |  |  |
| Water temperature (83° C.) | ○○○ | ○○○ | ○○△ |
| Water temperature (85° C.) | ○○○ | ○○○ | X△X |
| Water temperature (87° C.) | ○○○ | ○○○ | XXX |
| Water temperature (89° C.) | ○△△ | ○○○ | — |
| Water temperature (91° C.) | — | △△△ | — |
| Critical heat resistant temp. (°C.) | 89 | 91 | 83 |

Note:
PDDA: Phenylenedioxydiacetic acid unit
TPA: Terephthalic acid unit
○: No deformation
△: Slight deformation
X: Large deformation

EXAMPLE 5

Into a reaction vessel, were charged 9583 parts of dimethyl terephthalate (96 mol % of the acid component), 6390 parts of ethylene glycol and 2.1 parts of manganese acetate tetrahydrate. The temperature of the mixture was gradually raised from 160° C. to 220° C. over 4 hours to carry out ester interchange reaction. To the resultant product, were added 470 parts of 1.3-phenylenedioxy diacetic acid (4 mol % of the acid component), 1.5 parts of orthophosphoric acid and 1.5 parts of germanium dioxide. The temperature of the mixture was gradually raised from 220° C. while gradually reducing the pressure in the vessel from ordinary pressure, and polycondensation was carried out at 273° C. and 0.5 torr for total polycondensation time of 3.5 hours to obtain transparent copolyester chips having 0.96 of intrinsic viscosity.

After the chips were dried in vacuum, a sheet having 1200 μm thickness was formed using 40 mmφ extruder (manufactured Modern Machinery Co.) under the following conditions:
cylinder temperature: 275° C.,
nozzle temperature: 275° C., and screw rotation: 40 rpm.

The extruded sheet was subjected to simultaneous biaxial stretching in a ratio of 3 times in both the machine and transverse directions by a Long Stretching Machine (manufactured by T. M. Long Co. USA) having an inner temperature of 90° C., and then heat set at 200° C. under tension for 120 seconds in an oven.

The stretched film obtained showed good appearance and superior oxygen gas barrier property (oxygen gas permeability of 07 cc.mm/m$^2$.day.atm).

The stretched film was further subjected to retort treatment for one hour in an atmosphere of 120° C. and 100% relative humidity in a pressure cooker (manufactured by Hirayama Seisakusho K.K.), and oxygen gas permeability was again measured. The oxygen gas permeability was 1.09 cc.mm/m$^2$.day.atm, which was substantially the same as that before the retort treatment. Also, no change in its appearance was observed.

EXAMPLE 6

Into an autoclave, were charged 8200 parts of terephthalic acid (96 mol % of the acid component), 470 parts of 1,3-phenylenedioxy diacetic acid (4 mol % of the acid component), and 3835 parts of ethylene glycol, and esterification reaction was carried out at 220° to 245° C. for 3 hours with stirring under nitrogen gas atmosphere (2.5 kg/cm$^2$) while distilling off the water produced during the reaction. The esterified product was added with 1.5 parts of orthophosphoric acid and 1.5 parts of germanium dioxide. Then, in accordance with the method in Example 5, colorless and transparent copolyester chips having 0.65 of intrinsic viscosity were obtained.

A stretched film having good appearance was obtained from the chips in the same procedure as in Example 5, except that the stretching ratios in both the machine and transverse directions were changed to 3.5 times respectively. The oxygen gas permeability of the stretched film was 0.95 cc.mm/m$^2$.day.atm. Also, there was no change in oxygen gas permeability and its appearance before and after retort treatment similar to Example 5.

EXAMPLE 7

Colorless and transparent copolyester chips having 0.67 of intrinsic viscosity was obtained in the same procedure as in Example 5 except the use of 9712 parts of dimethyl terephthalate (97 mol % of the acid component), 6500 parts of ethylene glycol and 350 parts of 1,3-phenylenedioxy diacetic acid (3 mol % of the acid component).

A stretched film having good appearance was obtained from the chips in the same procedure as in Example 5, except that the stretching ratios in both the machine and transverse directions were changed to 3.8 times respectively. The oxygen gas permeability of the stretched film was 0.96 cc.mm/m$^2$.day.atm. Also, there was no change in oxygen gas permeability and its appearance before and after the retort treatment similar to Example 5.

COMPARATIVE EXAMPLE 5

A stretched film having good appearance was obtained from PET for packaging film (Diafoil-H manufactured by Diafoil Company, Limited) in the same procedure as in Example 5. The oxygen permeability of the stretched film was 1.58 cc.mm/m$^2$.day.atm. Although almost no change was observed in the oxygen gas permeability before and after the same retort treatment as in Example 5, the oxygen barrier property was inferior to those of Examples 5 to 7.

COMPARATIVE EXAMPLE 6

Transparent copolyester chips having 0.66 of intrinsic viscosity was obtained in the same procedure as in Example 5 except the use of 9392 parts of dimethyl terephthalate (94 mol % of the acid component), 6450 parts of ethylene glycol and 698 parts of 1,3-phenylenedioxy diacetic acid (6 mol % of the acid component).

The oxygen gas permeability of a stretched film obtained from the chips in the same procedure as in Example 5 was 1.16 cc.mm/m$^2$.day.atm, being a little inferior in gas barrier property compared with that of the film in Example 5. The film of Comparative Example 6 had a bad stretching property, a tendency of non-uniform stretching, uneven film thickness and inferior appearance.

COMPARATIVE EXAMPLE 7

A stretched film was obtained in the same procedure as in Comparative Example 6 except that the stretching ratios in both the machine and transverse directions were changed to 3.8 times respectively. The stretching property of the film was poor and the film had a tendency of non-uniform stretching, uneven film thickness and inferior appearance.

What is claimed is:

1. A copolyester comprising a dicarboxylic acid component which consists of two unit components of a unit derived from terephthalic acid and a unit derived from phenylenedioxy diacetic acid, and a diol component, said dicarboxylic acid component containing 1.0 to 4.0 mol % of the units derived from phenylenedioxy diacetic acid.

2. A copolyester according to claim 1, wherein said copolyester has an intrinsic viscosity of 0.4 to 2.0, the intrinsic viscosity having been determined at 30° C. in a 1:1 by weight mixed solvent of phenol and tetrachloroethane.

3. A copolyester according to claim 1, wherein the phenylenedioxy diacetic acid is 1,3-phenylenedioxy diacetic acid.

4. A copolyester according to claim 1, wherein the diol component comprises ethylene glycol.

5. A copolyester hollow container produced by the steps of:
   forming a preform by injection molding or extrusion molding the copolyester according to claim 1, and
   subjecting the preform to a biaxial-stretching blow molding.

6. A copolyester hollow container produced by the steps of:
   forming a preform by injection molding or extrusion molding the copolyester according to claim 1,
   subjecting the preform to a biaxial-stretching blow molding, and
   heat setting the blown-molded product.

7. A stretched copolyester film produced by the steps of:
   injection molding or extrusion molding the copolyester according to claim 1 to obtain a sheet, and
   stretching the sheet in the machine direction or transverse direction.

8. A stretched copolyester film produced by the steps of:
   injection molding or extrusion molding the copolyester according to claim 1 to obtain a sheet,
   stretching the sheet in the machine direction or transverse direction, and
   heat setting the stretched film.

* * * * *